United States Patent [19]
Randel

[11] 3,735,112
[45] May 22, 1973

[54] ILLUMINATED ELECTRONIC DOORBELL

[76] Inventor: Rikk Harrison Randel, 7403 Insey Street, S.E., Berkshire, Md. 20028

[22] Filed: Nov. 24, 1970

[21] Appl. No.: 92,390

[52] U.S. Cl. ............... 240/2 S, 240/2 SP, 240/2.13, 315/324, 331/130
[51] Int. Cl. ................. F21v 33/00, H05b 41/42
[58] Field of Search ............ 240/25, 2 SP, 2.13; 315/210, 324; 331/111, 129, 130

[56] References Cited

UNITED STATES PATENTS

| | | | |
|---|---|---|---|
| 2,717,336 | 9/1955 | Craddock | 315/324 X |
| 3,614,528 | 10/1971 | Craddock | 331/111 X |
| 2,596,166 | 5/1952 | Peterson | 240/2 SP X |
| 2,264,680 | 12/1941 | Roper | 240/2.13 X |
| 2,826,693 | 3/1958 | Resnik | 331/130 X |
| 3,054,970 | 9/1962 | Lace | 331/111 |

FOREIGN PATENTS OR APPLICATIONS 940,908  11/1963  Great Britain ............. 240/10 R

*Primary Examiner*—S. Clement Swisher
*Assistant Examiner*—Frederick Shoon
*Attorney*—Keith Misegades and George R. Douglas, Jr.

[57] ABSTRACT

An electronic doorbell being illuminated by a series of five or six neon tube relaxation oscillator circuits disposed about a pushbutton doorbell and which provide illumination for seeking out said doorbell.

1 Claim, 6 Drawing Figures

PATENTED MAY 22 1973 3,735,112

INVENTOR
RIKK H. RANDEL

BY Musegades & Douglas
ATTORNEY

INVENTOR
RIKK H. RANDEL

BY *Musegader & Douglas*
ATTORNEY

ILLUMINATED ELECTRONIC DOORBELL

The invention relates to an improved illuminated electronic doorbell having a relaxation oscillator of the neon tube type to provide a plurality of intermittently flashing neon tubes for illumination, and more particularly the invention relates to a series of parallel connected neon tube relaxation oscillators energized by the doorbell circuit for providing constant flashing illumination for identifying the location of a doorbell.

An object and purpose of the invention is to provide an apparatus in the form of an illuminated electronic doorbell which seeks to provide a psychological deterrent for burglars by providing an indication that a residence may be electronically protected against burglary.

Another object of the invention is to provide a simple electronic device that can be easily produced and assembled for installation in conjunction with a standard doorbell apparatus.

A further object and advantage of the invention is that it provides an illuminated doorbell that enhances the doorway and identifies the location of the doorbell of a residence.

An additional object of the invention is to provide a series of parallel connected neon tube-type relaxation oscillators, such oscillators being connected electrically to the power circuit for the doorbell, such that the neon lamps blink independently of one another; and if one becomes subject to failure or is otherwise disabled, the remaining neon lamps will continue to blink independent of one another and at a rate approximately of three flashes per second giving an effect of a continuously illuminated circuit area around the doorbell button.

A further object of the invention is to provide an illuminated electronic doorbell device that is electrically operable from house current or is battery operated, and which provides illumination for the doorbell about which it is mounted.

Another object of the invention is to use one of several capacitor-resistor type combinations with a discharge device such as a neon tube in order to provide a unit for forming a relaxation oscillator which may be mounted adjacent a doorbell for its illumination.

The above and other objects and advantages of the invention will become apparent upon full consideration of the following detailed description and accompanying drawings in which.

Figure 4:
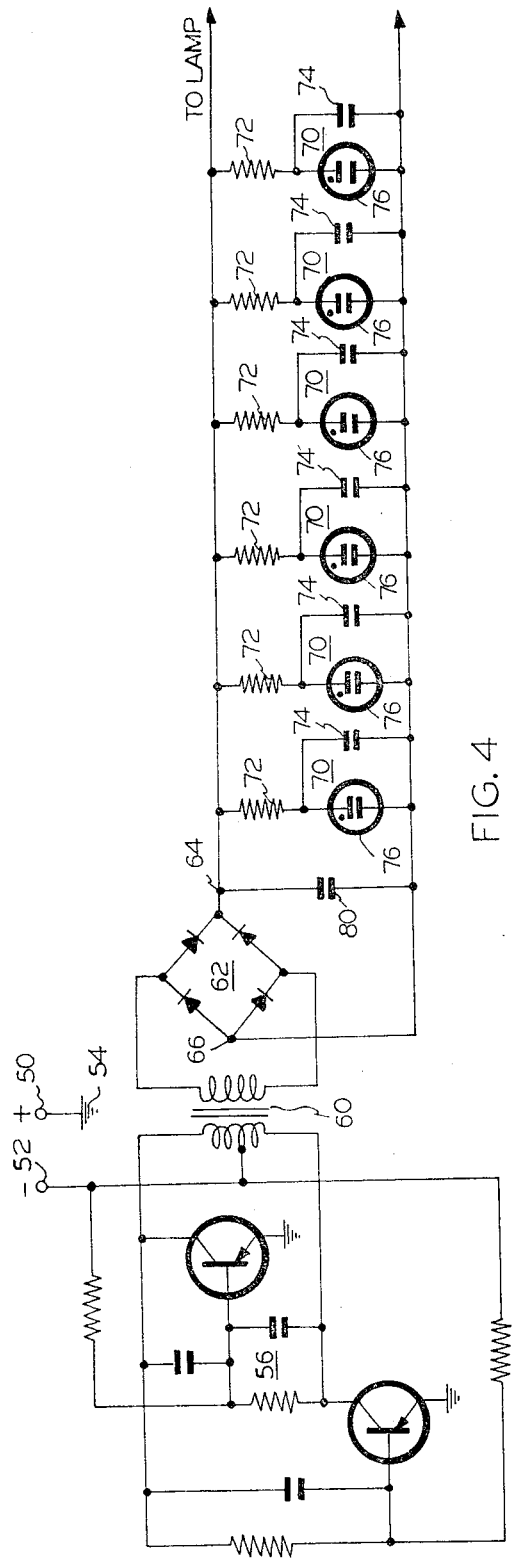
Figure 3A:
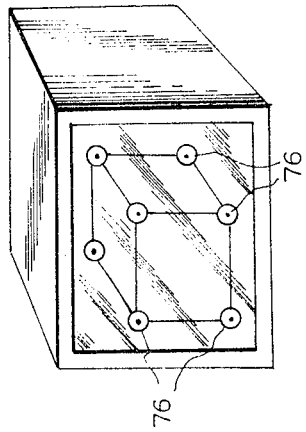
Figure 3:
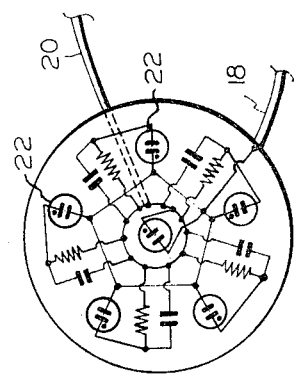

FIG. 3 shows a circuit schematically arranged so that the neon tubes are positioned about the doorbell according to the preferred embodiment of the invention, FIG. 3A shows a modification of the arrangement to show a display of such neon lamps on a box or container or the like; and FIG. 4 shows a schematic circuit diagram of neon blinkers provided with a DC to DC inverter, according to a preferred embodiment of the present invention.

Figure 1:
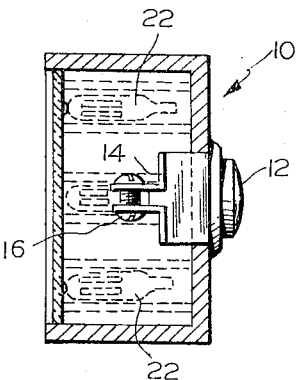
FIG. 1 shows a cross-sectional view of a neon tube arrangement in an illuminated electronic doorbell construction according to the preferred embodiment of the invention.
Figure 2:
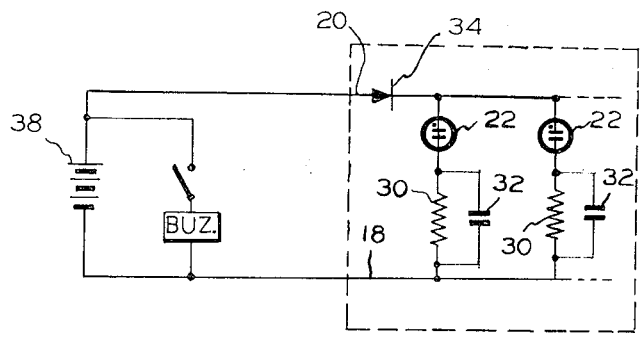
FIG. 2 shows a series of two relaxation circuits on a printed circuit board embodying the relaxation circuits according to a preferred embodiment of the invention.

Referring now to the drawings, there is shown a doorbell housing 10 which may be of preformed material such as plastic, or the like, having a conventional push switch doorbell element 12 centrally mounted therein, and having interiorly disposed therein a pair of contact elements 14,16 for connection to terminals 18,20 of the circuit, as shown in FIGS. 2 and 3.

Surrounding the peripheral part of the housing 10 are recesses for receiving neon lamps 22,22, or the like, which are part of and necessary for the circuits of FIGS. 2 and 3.

Figure 2A:
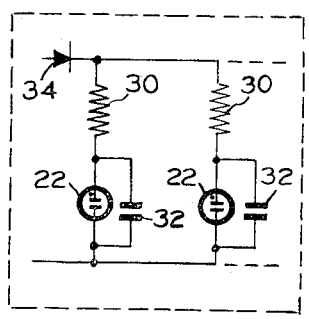
FIG. 2A shows a modification thereof.

The schematic circuits of FIGS. 2 and 2A and 3 show conventional R-C oscillator or R-C generator circuits, and FIGS. 2 and 3 show the manner in which the resistance 30 and the capacitor 32 are disposed parallel to each other and then connected in series to the lamp 22, forming a branch network across the terminals 18,20 after a circuit rectifier 34 is connected to the conjoint terminal of all of the lamps 22.

The terminals 14,16 of the doorbell switch 10 shown in FIG. 2 are in series with a buzzer 36 connected in circuit with a source of current such as a battery 38.

The operation of the R-C circuit is such that current from the battery 38 flows through the rectifier 34 to the relaxation circuit. The effect of the current flow is that the capacitor 32 is charged and, due to the time constant of the R-C circuit, will discharge through the resistance 30, and the neon tube 22 is accordingly illuminated in flashes while the capacitance is being charged, the description of which is well known.

An alternative arrangement of an R-C circuit is shown in FIG. 2A where the rectifier provides current flow directionally to the R-C circuit with the discharge element in the form of a lamp 22, so that the capacitance 32 is charged through the resistance 30 in a conventional manner, until the discharge characteristic of the lamp 22 is approached, at which point in time the charge of the capacitance 32 dumps or is discharged into the lamp 22, producing a flash or a short period of illumination.

Each of the time constants of the R-C networks of the circuits shown in FIGS. 2, 2A and 3 is such that they are provided at random and the lamps illuminate at different times, but may at time coalesce in discharge duration with other discharge periods of the lamps 22; there is a randomness in illumination of the various lamps, there being usually 5–8 in number disposed in the housing 10 to effect attention to the location of the doorbell, and where a person may depress the switch of the doorbell.

FIG. 3A shows a display without a doorbell but in which the lamps project from a small box that encloses the electronic circuitry and the common source with its terminals.

There is shown a modification in FIG. 4 in which a DC to DC inverter may be used where higher voltage is desired in triggering the neon lamps, and there are provided terminals 50,52 for connection to a 2–3 volt DC source of current, such as a battery (not shown). Terminal 50 may be connected to a common connection or ground 54, and the other terminal 52 is connected to transistor chopper or oscillator network 56 to provide intermittent pulses to a primary of a transformer 60. The secondary winding of the transformer 60 steps the current from the chopped or alternating value of the battery supplied to terminal 52 from 2–3 volts to about a range of 6–117 volts, as may be desired, and the transformer secondary is connected to a rectifier network 62 which may be a full wave rectifier, to produce a DC value of current at terminals 64,66, that may be applied to the lamp oscillator units 70,70. Each of the units 70 may comprise a resistance 72 and a capacitance 74 and a neon tube 76, the resistance 72 being used to provide a charging current to charge the capacitor 74, which charges to a value approaching its full charge value; it is discharged as soon as the discharge characteristic value of the neon lamp 76 is reached, at which time the capacitance 74 quickly discharges through the lamp 76 for a period of illumination or flashing of the lamp. The lamp then illuminates for such period, and each of the circuits or units 70 provides a randomness or non-synchronous effect of these lamps during the period of illumination.

A filter means, such as condenser 80, provides a smoothing effect on the voltage applied across terminals 64,66.

Additional embodiments of the invention is this specification will occur to others and, therefore, it is intended that the true spirit of the invention be limited only by the appended claims and not by the embodiments described hereinabove. Accordingly, reference should be made to the following claims in determining the true spirit of the invention.

What is claimed is:

1. An illuminated doorbell switch including a system of continuously randomly illuminated lamps, comprising a housing having a front face upon which are projecting a plurality of neon lamps, an R-C circuit in circuit relation to each of the lamps, said R-C circuit and neon lamp forming a unit connected across common terminals, the unit being provided with the lamp in series with the parallel relationship of the resistance and capacitance, said common terminals being connected to a common source of current such as a battery, a pushbutton and doorbell arrangement means across said common source, said doorbell means being located centrally in the housing with respect to the location of said lamps projecting upon the surface thereof, and a DC–DC converter being interposed between the common terminals of said unit and the source of current therefor to provide increased application of voltage to the said units, said resistance being in series with the parallel relationship of the lamp and the capacitor, the housing being a single compact and packaged unit, so that each neon lamp flashes independently of each of the others and at a rate of approximately 3–6 flashes per second, the lamps being essentially circularly disposed about an area surrounding the doorbell button.

* * * * *